3,024,166
ANALGESIC DIHYDROXYMETHYL-
BENZIMIDAZOL-2-ONES
Samuel Kuna, Westfield, and Anthony W. Pircio, East
Brunswick, N.J., assignors to Bristol-Myers Company,
New York, N.Y., a corporation of Delaware
No Drawing. Filed Mar. 22, 1960, Ser. No. 16,640
14 Claims. (Cl. 167—65)

This invention relates to therapeutic compositions. More specifically, this invention relates to compositions containing certain dihydroxybenzimidazols which can be used as analgesics or central nervous system depressants e.g., for their sedative and tranquilizing activity.

The therapeutic compositions of this invention comprise, as the therapeutically active agent, a dihydroxymethylbenzimidazol having the following generic formula:

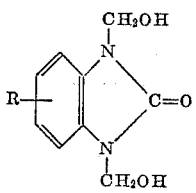

wherein R is either hydrogen, a (lower) alkyl radical, a halogen atom, a (lower) alkoxy radical, a lower trihaloalkyl such as the trifluoromethyl radical, and the nitro radical. When R is a (lower) alkyl radical or a (lower) alkoxy radical, the radical can contain from 1 to 4 carbon atoms such as methyl, ethyl, isopropyl, propyl, tertiary butyl and the like. Elements such as chlorine, bromine, iodine or fluorine can be employed as the halogen atom in the above described generic formula. The term "(lower)" alkyl as used herein means both straight and branched chain alkyl radicals having from 1 to 4 carbon atoms. Similarly, where the term "(lower)" is used as part of the description of another group, e.g., "(lower)" alkoxy, it refers to the alkyl portion of such group which is therefore as disclosed above in connection with "(lower)" alkyl.

Illustrative of specific compounds suitable for this invention there can be mentioned: 1,3-di(hydroxymethyl)-benzimidazol-2-one; 1,3 - di(hydroxymethyl)-5-methyl-benzimidazol-2-one; 1,3 - di(hydroxymethyl) - 5-chlorobenzimidazol - 2 - one; 1,3 - di(hydroxymethyl) - 6-ethyl - benzimidazol - 2 - one; 1,3 - di(hydroxymethyl)-7 - isopropyl - benzimidazol - 2 - one; 1,3 - di(hydroxymethyl) - 5 - bromo - benzimidazol - 2 - one; 1,3 - di(hydroxymethyl) - 5 - nitro - benzimidazol - 2 - one; 1,3-di(hydroxymethyl) - 5 - methoxy - benzimidazol - 2-one; 1,3 - di(hydroxymethyl) - 6 - trifluoromethyl - benzimidazol-2-one and the like. The dihydroxymethylbenzimidazol-2-ones of this invention can be prepared by known methods such as those set out in U.S. Patent No. 2,732,316 which issued on January 24, 1956, to July et al.

The 1,3-dihydroxymethylbenzimidazol-2-ones can be administered by the conventional methods, the conventional types of unit dosages or with the conventional pharmaceutical carriers to produce an analgesic or central nervous system depressant effect in human beings and animals. Oral administration by the use of tablets, capsules or in liquid form such as suspensions, solutions or emulsions is particularly advantageous. When formed into tablets, the conventional binding and disintegrating agents used in therapeutic unit dosages can be employed. Illustrative of binding agents there can be mentioned glucose, lactose, gum acacia, gelatin, mannitol, starch paste, magnesium trisilicate and talc. Illustrative of disintegrating agents there can be mentioned corn starch, keratin, colloidal silica and potato starch. When administered as liquids the conventional liquid carriers can be used.

The unit dosage or therapeutically effective quantity of the dihydroxymethylbenzimidazol-2-ones for human beings for the therapeutic uses of the invention can vary over wide limits such as that of about 0.1 of a grain to about 25 grains or more such as 100 grains. The upper limit is limited only by the degree of effect desired and economic considerations. For oral administration it is preferable to employ from about 1 to about 10 grains of the therapeutic agent per unit dosage. It is indicated from animal experiments that about 1 to about 10 grain dosages administered orally four times daily as needed will provide a preferred daily dosage. Of course, the dosage of the particular therapeutic agent used can vary considerably, such as the age of the patient and the degree of therapeutic effect desired. Each unit dosage form of the novel therapeutic compounds can contain from about 5% to about 95% and preferably from about 10% to 80% of the novel therapeutic agents by weight of the entire composition with the remainder comprising conventional pharmaceutical carriers. By the term pharmaceutical carrier we intend to include nontherapeutic materials which are conventionally used with unit dosages and includes fillers, diluents, binders, lubricants, disintegrating agents and solvents. Of course, it is possible to administer the novel therapeutics, i.e., the pure compounds, without the use of a pharmaceutical carrier. When the therapeutic agents of this invention are employed for one of their enumerated utilities such as analgesics for the amelioration of pain such as the common headache, mild rheumatism and the like, they can be administered either prior to or after the onset of the discomfort.

The analgesic activity of the compounds of this invention is more pronounced than that of aspirin and they have a lower toxicity than aspirin (LD–50 of 1,3-di(hydroxymethyl)-benzimidazol-2-one in mice is about 2000 milligrams per kilogram of body weight whereas that for aspirin is about 1500 milligrams per kilogram of body weight.

The invention is illustrated by the following examples of suitable therapeutic compositions in unit dosage form, although it is not intended that the compostions or dosages be limited by any of the proportions, amounts, types of carriers, or dosage units set forth therein.

EXAMPLE 1

A suitable formulation of tablets consists of:

| | Grams |
|---|---|
| (1) 1,3 - di(hydroxymethyl)-benzimidazol-2-one | 12.5 |
| (2) Lactose | 80 |
| (3) Starch | 5 |
| (4) Magnesium stearate | 2 |

The 1,3 - di(hydroxymethyl)-benzimidazol-2-ones, lactose and starch are thoroughly mixed and granulated. For tableting, the magnesium stearate is added, mixed with the granules, and the mixture tableted on a rotary press. Use of this procedure produces 100 tablets each containing 125 mg. of the active therapeutic agent.

EXAMPLE 2

Another suitable formulation of tablets consists of:

| | Grams |
|---|---|
| (1) 1,3 - di(hydroxymethyl)-5-methyl-benzimidazol-2-one | 25 |
| (2) Mannitol | 160 |
| (3) Starch | 10 |
| (4) Magnesium stearate | 4 |

The 1,3 - di(hydroxymethyl) - 5 - methyl - benzimidazol-2-one, mannitol and starch are thoroughly mixed and granulated. For tableting, the magnesium stearate is added, mixed with granules, and the mixture tableted on a rotary press. Use of this procedure produces 100 tablets each containing 250 mg. of the active therapeutic agent.

EXAMPLE 3

Another suitable formulation of tablets consists of:

| | Grams |
|---|---|
| (1) 1,3 - di(hydroxymethyl)-benzimidazol-2-one | 25 |
| (2) b-Lactose | 70 |
| (3) Dextrin | 10 |
| (4) Hydrogenated vegetable oil | 0.5 |
| (5) Talc | 2 |

The 1,3 - di(hydroxymethyl) - benzimidazol - 2 - one, b-lactose, and dextrin are thoroughly mixed and granulated. For tableting, the hydrogenated vegetable oil and talc are added, mixed with the granules, and the mixture tableted on a rotary press. Use of this procedure produces 200 tablets of 125 mg. of active therapeutic agent.

EXAMPLE 4

Another suitable formulation of tablets consists of preparing tablets by the conventional techniques wherein each tablet contains:

| | Grams |
|---|---|
| (1) 1,3 - di(hydroxymethyl) - 5 - chloro-benzimidazol-2-one | 0.550 |
| (2) Starch corn (U.S.P.) | 0.065 |
| (3) Talc (U.S.P.) | 0.015 |
| (4) Micronized calcium silicate | 0.015 |
| (5) Magnesium stearate | 0.005 |
| Total | 0.650 |

EXAMPLE 5

A suitable formulation of oral elixir consists of:

(1) 1,3 - di(hydroxymethyl) - benzimidazol - 2-one _____grams__ 475.2
(2) Aromatic elixir base to make 47.5 liters.
    Base contains: orange spirits, sugar syrup, ethyl alcohol and distilled water.

Use of the above formula will make 100 pint bottles of oral elixir. Each bottle contains approximately 100 one-teaspoon doses. Each dose contains 50 mg. of active therapeutic agent.

EXAMPLE 6

This example shows analgesic effect on rats by the tail flick test. This test is performed by uniformly blackening the tails of rats, administering an analgesic to the animal and subsequently focusing a beam of light on the animal's tail at various intervals of time after administration of the analgesic. The time required for the animal to flick its tail after the beam of light is applied determines the analgesic effect of the material being tested. The longer the interval for the tail flick after the application of the concentrated beam of light, the more effective is the analgesic. 1,3-di(hydroxymethyl)-benzimidazol-2-one, 100 milligrams per kilogram weight of each rat, was orally administered to 5 rats. The same quantities of aspirin were also administered to similar rats. Table 1 shows the results of the analgesic tests.

Table 1

| Times in minutes after administration of analgesic | | 5 | 10 | 15 | 20 | 40 | 60 |
|---|---|---|---|---|---|---|---|
| Time, in seconds, for pain response of animals which had ingested the 1,3-di (hydroxymethyl)-benzimidazol-2-one | 1 4.1 | 5.0 | 5.5 | 5.6 | 6.3 | 6.5 | 6.0 |
| Time, in seconds, for pain response of animals which had ingested aspirin | 1 4.1 | | | | 4.5 | 4.3 | 3.8 |

1 Immediately prior to administration of analgesic.

EXAMPLE 7

This example shows central nervous system depressant activity for the dihydroxymethylbenzimidazol-2-ones. Mice were given an electric shock by means of corneal electrodes and the number of mice were noted which went into tonic extensor convulsions or which died. The apparatus employed for administering the electric shock was a Hans Technical Electricshock Seizure Apparatus, Model 2–C. The electric shock passed for 0.2 second through Spiegal corneal electrodes which were held by the operator against the eyes of the mouse. The machine was set at 60 cycles per second and 15 milliamperes for a 0.2 second electric shock duration. Only one electric shock was simultaneously administered to each eye of the mouse. This setting produced 100% convulsions in normal undrugged mice. The mice which ranged in weight from 18 to 26 grams were grouped in series of ten animals each. The electroshock was given to the mice 0.5 hour after dosing. Ten mice were given oral doses of 500 mg. of 1,3-di(hydroxymethyl)-benzimidazol-2-one per kg. of animal body weight and tested by the above described electroshock procedure. A similar group of ten mice which were not treated with the benzimidazol compound were used as controls. The results of this example appear in Table 2.

Table 2

| | Number of mice tested | Number of mice having tonic extensor convulsions | Deaths |
|---|---|---|---|
| Test mice | 10 | 0 | 0 |
| Control mice | 10 | 10 | 1 |

What is claimed is:

1. An analgesic composition in unit dosage form comprising a significant quantity of a pharamaceutical carrier and from about 0.1 to 25 grains of a dihydroxymethylbenzimidazol-2-one having the following generic formula:

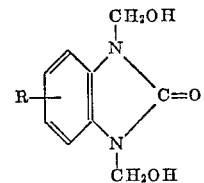

wherein R is a member selected from the group consisting of hydrogen, a (lower) alkyl radical, a halogen atom, a (lower) alkoxy radical, the nitro radical and the trifluoromethyl radical.

2. The analgesic composition of claim 1 wherein R of the generic formula is a (lower) alkyl radical.

3. The analgesic composition of claim 1 wherein R of the generic formula is a (lower) alkoxy radical.

4. The analgesic composition of claim 1 wherein R of the generic formula is a halogen atom.

5. The analgesic composition of claim 4 wherein the halogen atom is chlorine.

6. A method for inducing analgesia which comprises administering to an animal, including a human, from about 0.1 to 25 grains of a dihydroxymethylbenzimidazol-2-one having the following generic formula:

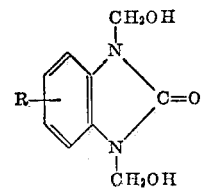

wherein R is a member selected from the group consisting of hydrogen, a (lower) alkyl radical, a halogen atom, a (lower) alkoxy radical, the nitro radical, and the trifluoromethyl radical.

7. The method of claim 6 wherein R of the generic formula is a (lower) alkyl radical.

8. The method of claim 6 wherein R of the generic formula is a (lower) alkoxy radical.

9. The method of claim 6 wherein R of the generic formula is a halogen atom.

10. The method of claim 9 wherein the halogen is a chlorine atom.

11. An analgesic composition in unit dosage form comprising a significant quantity of a pharmaceutical carrier and from about 1 to about 10 grains of 1,3-di(hydroxymethyl)-benzimidazol-2-one.

12. A method of inducing analgesia which comprises administering to an animal, including a human, from about 1 to about 10 grains of 1,3-di(hydroxymethyl)-benzimidazol-2-one.

13. A method of inducing sedation which comprises administering to an animal, including a human, from about 0.1 to 25 grains of a dihydroxymethylbenzimidazol-2-one having the following generic formula:

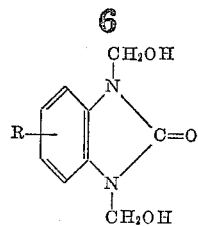

wherein R is a member selected from the group consisting of hydrogen, a (lower) alkyl radical, a halogen atom, a (lower) alkoxy radical, the nitro radical, and the trifluoromethyl radical.

14. A method for inducing sedation which comprises administering to an animal, including a human, from about 1 to about 10 grains of 1,3-di(hydroxymethyl)-benzimidazol-2-one.

References Cited in the file of this patent
UNITED STATES PATENTS
2,843,597    Clark et al. _____ July 15, 1958

OTHER REFERENCES
July et al.: C.A. 50, p. 7640(b), 1956.
Spirer et al.: C.A. 50, p. 311(c), 1956.
Monti et al.: C.A. 42, p. 1261(e), 1948.
Domino et al.: J. Pharm. Exper. Therap., 105, 486–497.